(12) United States Patent
Nakano

(10) Patent No.: US 12,395,083 B2
(45) Date of Patent: Aug. 19, 2025

(54) BOOST CONVERTER CONTROL DEVICE AND CONTROL METHOD OF BOOST CONVERTER CONTROL DEVICE

(71) Applicant: TOYOTA JIDOSHA KABUSHIKI KAISHA, Toyota (JP)

(72) Inventor: Taiki Nakano, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 208 days.

(21) Appl. No.: 18/466,280

(22) Filed: Sep. 13, 2023

(65) Prior Publication Data

US 2024/0204667 A1 Jun. 20, 2024

(30) Foreign Application Priority Data

Dec. 14, 2022 (JP) ................. 2022-199607

(51) Int. Cl.
| | |
|---|---|
| *H02P 27/06* | (2006.01) |
| *B60L 50/60* | (2019.01) |
| *B60L 58/25* | (2019.01) |
| *B60L 58/27* | (2019.01) |
| *H01M 10/48* | (2006.01) |
| *H01M 10/615* | (2014.01) |

(Continued)

(52) U.S. Cl.
CPC .......... *H02M 3/1586* (2021.05); *B60L 50/60* (2019.02); *B60L 58/25* (2019.02); *B60L 58/27* (2019.02); *H01M 10/486* (2013.01); *H01M 10/615* (2015.04); *H01M 10/625* (2015.04); *H01M 10/63* (2015.04); *H01M 10/657* (2015.04); *B60L 2210/14* (2013.01); *B60L 2240/545* (2013.01); *B60L 2240/549* (2013.01); *H01M 2220/20* (2013.01); *H02P 27/06* (2013.01)

(58) Field of Classification Search
CPC .......... B60L 50/60; B60L 58/25; B60L 58/27; B60L 2210/14; H01M 10/486; H01M 10/615; H01M 10/625; H01M 10/63; H01M 10/657; H02M 3/1586; H02P 27/06
See application file for complete search history.

(56) References Cited

U.S. PATENT DOCUMENTS

| | | | |
|---|---|---|---|
| 8,669,744 B1 * | 3/2014 | Vinciarelli | H02M 3/1582 323/235 |
| 9,733,287 B2 * | 8/2017 | Goldsmith | H02J 1/10 |

(Continued)

FOREIGN PATENT DOCUMENTS

| | | |
|---|---|---|
| JP | 2010-259217 A | 11/2010 |
| JP | 2020-137391 A | 8/2020 |

*Primary Examiner* — Thai T Dinh
(74) *Attorney, Agent, or Firm* — SoraIP, Inc.

(57) ABSTRACT

The boost converter control device includes a plurality of boost converters connected in parallel to each other with respect to the secondary batteries, and an ECU (control unit) that controls each of the plurality of boost converters. When warm-up of the secondary battery is required, ECU performs a first control for adjusting the phases of the plurality of boost converters to be in phase with each other in response to the current value flowing through the secondary battery becoming larger than a predetermined threshold, and performs a second control for stopping the operation of a part of the plurality of boost converters in response to the current value flowing through the secondary battery becoming equal to or smaller than the predetermined threshold.

5 Claims, 4 Drawing Sheets

(51) Int. Cl.
*H01M 10/625* (2014.01)
*H01M 10/63* (2014.01)
*H01M 10/657* (2014.01)
*H02M 3/158* (2006.01)

(56) References Cited

U.S. PATENT DOCUMENTS

| | | | |
|---|---|---|---|
| 11,312,247 B2* | 4/2022 | Oi | B60L 50/64 |
| 2016/0261205 A1* | 9/2016 | Kolar | H02M 1/32 |
| 2020/0269707 A1 | 8/2020 | Oi et al. | |

* cited by examiner

IN-PHASE CONTROL (FIRST CONTROL)

IN-PHASE CONTROL (FIRST CONTROL)

ONE-SIDED CONTROL (SECOND CONTROL)

ONE-SIDED CONTROL (SECOND CONTROL)

NORMAL CONTROL (THIRD CONTROL)

NORMAL CONTROL (THIRD CONTROL)

BOOST CONVERTER CONTROL DEVICE AND CONTROL METHOD OF BOOST CONVERTER CONTROL DEVICE

CROSS-REFERENCE TO RELATED APPLICATION

This application claims priority to Japanese Patent Application No. 2022-199607 filed on Dec. 14, 2022, incorporated herein by reference in its entirety.

BACKGROUND

1. Technical Field

The present disclosure relates to a boost converter control device and a control method of the boost converter control device.

2. Description of Related Art

Japanese Unexamined Patent Application Publication No. 2020-137391 (JP 2020-137391 A) discloses a system in which two boost converters connected in parallel to each other to a battery of a battery electric vehicle are provided.

SUMMARY

In the system disclosed in JP 2020-137391 A, warm-up of a battery may be required. In this case, it is desired to increase the amount of heat generated by the battery by increasing the ripple current of a plurality of boost converters.

The present disclosure has been made to solve the above issue. An object of the present disclosure is to provide a boost converter control device and a control method of the boost converter control device capable of increasing the amount of heat generated by a secondary battery by increasing the ripple current by the boost converters, when the warm-up of the secondary battery is required.

A boost converter control device according to a first aspect of the present disclosure is a boost converter control device for driving a traction motor of an electrified vehicle, and includes:

a plurality of boost converters that is connected in parallel to each other to a secondary battery for supplying electric power to the traction motor and boosts a voltage of the secondary battery; and a control unit for controlling each of the boost converters. Each of the boost converters is composed of a reactor and a switching element.

When warm-up of the secondary battery is required, the control unit performs first control for adjusting phases of at least two of the boost converters to be in the same phase, in response to a current value flowing through the secondary battery becoming larger than a predetermined threshold value, and performs second control for stopping an operation of a part of the boost converters, in response to the current value flowing through the secondary battery becoming equal to or less than the predetermined threshold value.

Note that the fact that the boost converters have the same phase means that timings at which the switching elements in the boost converters are turned on (off) are the same with each other.

In the boost converter control device according to the first aspect of the present disclosure, as described above, the first control for adjusting phases of at least two of the boost converters to be in the same phase is performed, in response to a current value flowing through the secondary battery becoming larger than a predetermined threshold value, when warm-up of the secondary battery is required. As a result, the timings at which the ripple current is generated based on the operation of each of the boost converters can be the same with each other, so that the amount of heat generated by the secondary battery based on the magnitude (total value) of the ripple current can be increased. Further in the boost converter control device, the second control for stopping an operation of a part of the boost converters is performed in response to the current value flowing through the secondary battery becoming equal to or less than the predetermined threshold value. This makes it possible to increase the current value flowing through the boost converter that is not stopped as compared with a case where all the boost converters are operating. Here, the inductance of the reactor decreases as the current value flowing through the reactor increases. Further, the ripple current increases as the inductance of the reactor decreases. Therefore, the amount of heat generated by the secondary battery based on the ripple current can be increased. As described above, the amount of heat generated by the secondary battery can be increased by increasing the ripple current by the boost converters.

In the boost converter control device according to the first aspect, preferably, the predetermined threshold value is a half of a maximum allowable value of a current flowing through the secondary battery.

With this configuration, it is possible to suppress the current value flowing through the boost converter (reactor) from decreasing in the second control as compared with a case where the predetermined threshold value is smaller than a half of the maximum allowable value. As a result, it is possible to easily suppress the ripple current in the second control from decreasing.

Preferably, the boost converter control device according to the first aspect further includes a temperature sensor for detecting a temperature of the secondary battery. When a detected value of the temperature sensor is within a predetermined range below a freezing point, the control unit determines that the warm-up of the secondary battery is required.

With this configuration, the first control and the second control in which the ripple current is increased under the temperature condition below the freezing point are performed. As a result, it is possible to suppress, due to a low temperature, deterioration of electric devices other than the secondary battery due to an increase in the ripple current (an increase in the amount of heat generated).

In the boost converter control device according to the first aspect, preferably, the boost converters include a first boost converter and a second boost converter.

The control unit performs third control for adjusting a phase of the first boost converter and a phase of the second boost converter to be in opposite phases from each other, when the warm-up of the secondary battery is not required.

The first control includes control for adjusting the phase of the first boost converter and the phase of the second boost converter to be in the same phase with each other.

The second control includes control for stopping the other of the first boost converter and the second boost converter in a state in which one of the first boost converter and the second boost converter is operated.

With this configuration, when the warm-up of the secondary battery is not required, the timing at which the ripple current is generated by the operation of the first boost converter and the timing at which the ripple current is generated by the operation of the second boost converter can be shifted from each other. As a result, an increase in the amount of heat generated by the secondary battery due to the ripple current can be suppressed. Further, when the warm-up of the secondary battery is required, the amount of heat generated by the secondary battery can be increased by increasing the ripple current by the first boost converter and the second boost converter.

A control method of a boost converter control device according to a second aspect of the present disclosure is a control method of a boost converter control device for driving a traction motor.

Each of the boost converters that is connected in parallel to the secondary battery for supplying electric power to the traction motor and boosts a voltage of the secondary battery includes a reactor and a switching element.

The control method includes:
- a step of performing first control for adjusting phases of at least two of the boost converters to be in the same phase, in response to a current value flowing through the secondary battery becoming larger than a predetermined threshold value, when warm-up of the secondary battery is required, and
- a step of performing second control for stopping a part of the boost converters, in response to the current value flowing through the secondary battery becoming equal to or less than the predetermined threshold value, when the warm-up of the secondary battery is required.

In the control method according to the second aspect of the present disclosure, as described above, the first control for adjusting phases of at least two of the boost converters to be in the same phase is performed, in response to a current value flowing through the secondary battery becoming larger than a predetermined threshold value, when warm-up of the secondary battery is required. Further in the above control method, the second control for stopping an operation of a part of the boost converters is performed in response to the current value flowing through the secondary battery becoming equal to or less than the predetermined threshold value, when the warm-up of the secondary battery is required. Accordingly, it is possible to provide the control method of the boost converter control device capable of increasing the amount of heat generated by the secondary battery by increasing the ripple current of the boost converters.

According to the present disclosure, when the warm-up of the secondary battery is required, the amount of heat generated by the secondary battery can be increased by increasing the ripple current by the boost converters.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
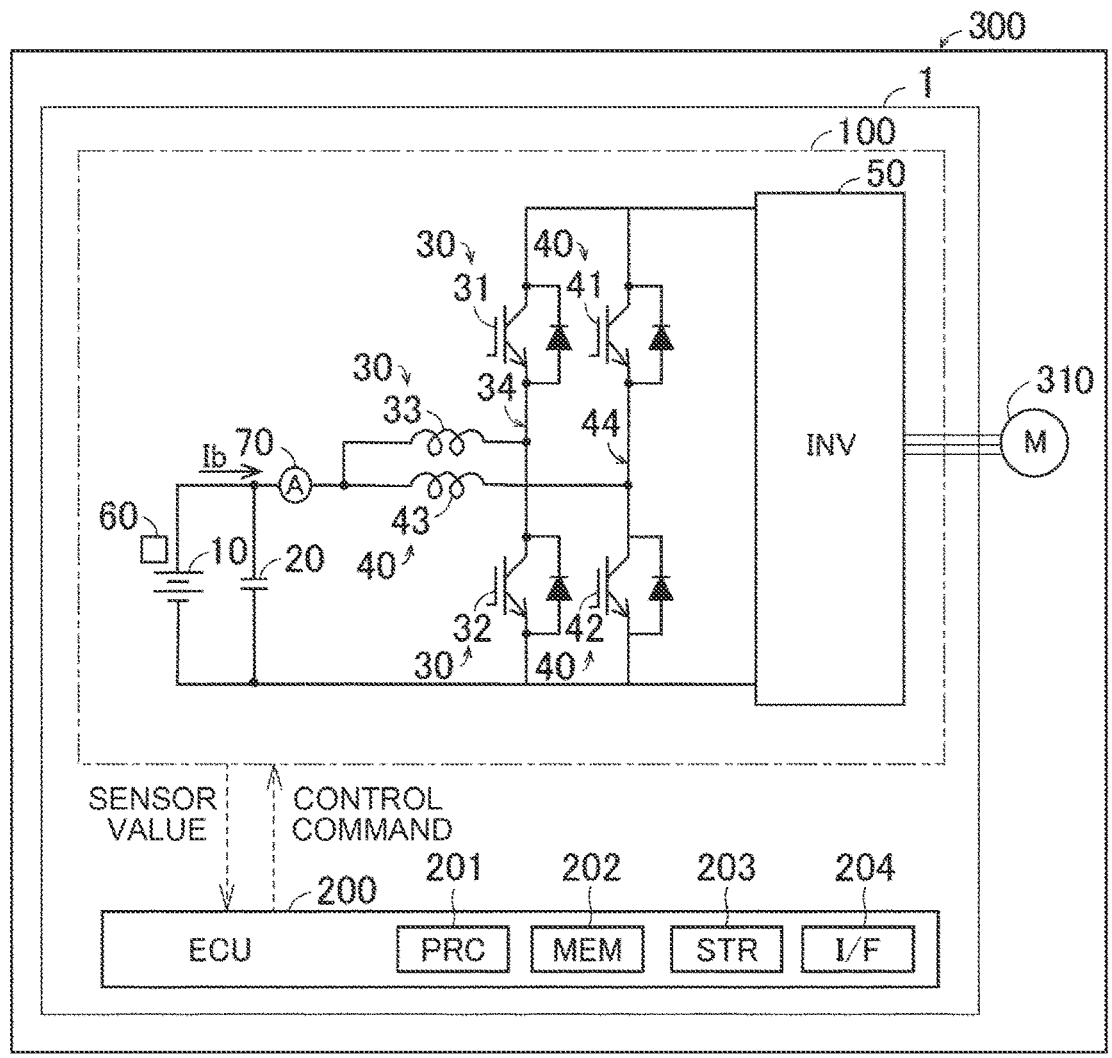
FIG. 1 is a diagram illustrating a configuration of a boost converter control device according to an embodiment.

Hereinafter, embodiments of the present disclosure will be described in detail with reference to the drawings. In the drawings, the same or corresponding parts are denoted by the same reference numerals. The description of the same or corresponding parts will not be repeated.

FIG. 1 is a diagram illustrating a configuration of a boost converter control device 1 according to the present embodiment. The boost converter control device 1 drives electrified vehicle 300 driving motor 310. The boost converter control device 1 includes a boost circuit 100 and an electronic control unit Electronic Control Unit (ECU) 200. Note that ECU 200 is an exemplary "control unit" of the present disclosure.

The boost circuit 100 includes a secondary battery 10, a film capacitor 20, a first boost converter 30, a second boost converter 40, an inverter 50, a temperature sensor 60, and a current sensor 70. Each of the first boost converter 30 and the second boost converter 40 is an example of a "boost converter" of the present disclosure.

The secondary battery 10 supplies electric power to the traveling motor 310. Further, the secondary battery 10 is supplied with regenerative energy from the traveling motor 310. The film capacitor 20 is connected in parallel to the secondary battery 10.

The first boost converter 30 includes a switching element 31 of the upper arm, a switching element 32 of the lower arm, and a reactor 33. The reactor 33 is connected to a node 34 that connects the switching element 31 and the switching element 32.

The second boost converter 40 includes a switching element 41 of the upper arm, a switching element 42 of the lower arm, and a reactor 43. The reactor 43 is connected to a node 44 that connects the switching element 41 and the switching element 42.

The first boost converter 30 and the second boost converter 40 are connected in parallel to each other with respect to the secondary battery 10. That is, each of the first boost converter 30 and the second boost converter 40 is supplied with a current from a common secondary battery 10. Each of the first boost converter 30 and the second boost converter 40 boosts the voltage applied to the inverter 50 to a voltage equal to or higher than the voltage of the secondary battery 10.

The temperature sensor 60 measures the temperature of the secondary battery 10. The readings of the temperature sensor 60 are transmitted to ECU 200.

The current sensor 70 measures a current Ib flowing through the secondary batteries 10. The current sensor 70 is provided between each of the reactor 33 and the reactor 43 and the secondary battery 10.

ECU 200 controls each of the first boost converter 30 and the second boost converter 40. ECU 200 includes a processor 201, a memory 202, a storage 203, and an interface 204.

The processor 201 is, for example, Central Processing Unit (CPU) or Micro-Processing Unit (MPU). The memories 202 are, for example, Random Access Memory (RAM). The storage 203 is a rewritable nonvolatile memory such as Hard Disk Drive (HDD), Solid State Drive (SSD), and flash memory. The interface 204 controls communication between ECU 200 and the components of the boost circuit 100.

ECU 200 generates a control command based on sensor values acquired from various sensors (60, 70) included in the boost circuit 100, and outputs the generated control command to the boost circuit 100. ECU 200 may be divided into a plurality of ECU for each function. Also shown in FIG. 1 is an exemplary ECU 200 including one processor 201. However, ECU 200 may include a plurality of processors. The same applies to the memory 202 and the storage 203.

Here, in the conventional system, warm-up of the secondary battery may be required. In this case, it is desired to increase the heating value of the secondary battery by increasing the ripple current of the plurality of boost converters.

Figure 2:
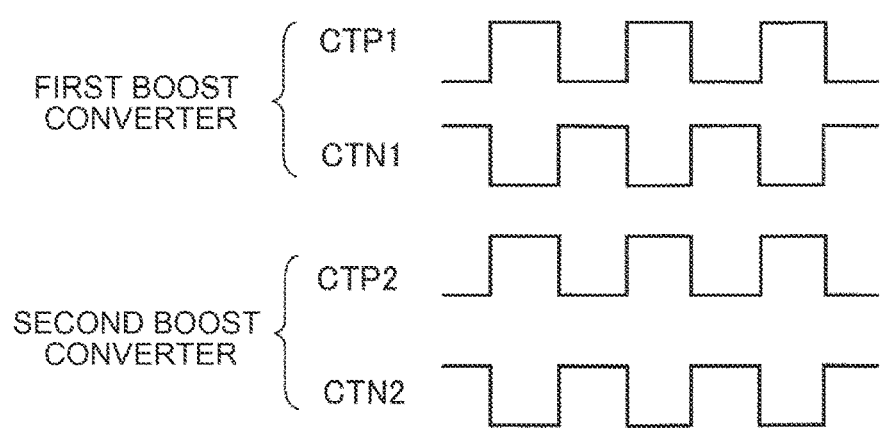
FIG. 2 is a diagram illustrating a first control (in-phase control) of a boost converter control device according to an embodiment.

Therefore, in the present embodiment, when warm-up of the secondary battery 10 is required, ECU 200 performs first control (in-phase control) to adjust the phases of the first boost converter 30 and the second boost converter 40 to be in phase with each other in response to the fact that the value of the current Ib flowing through the secondary battery 10 becomes larger than a predetermined threshold. Specifically, as shown in FIG. 2, in the first control, the timing at which the switching element 31 (CTP 1) is turned on (off) and the timing at which the switching element 41 (CTP 2) is turned on (off) are aligned. The switching element 32 (CTN 1) is turned on and off in a phase opposite to that of the switching element 31. The switching element 42 (CTN 2) is turned on and off in the opposite phase to the switching element 41.

Figure 3:
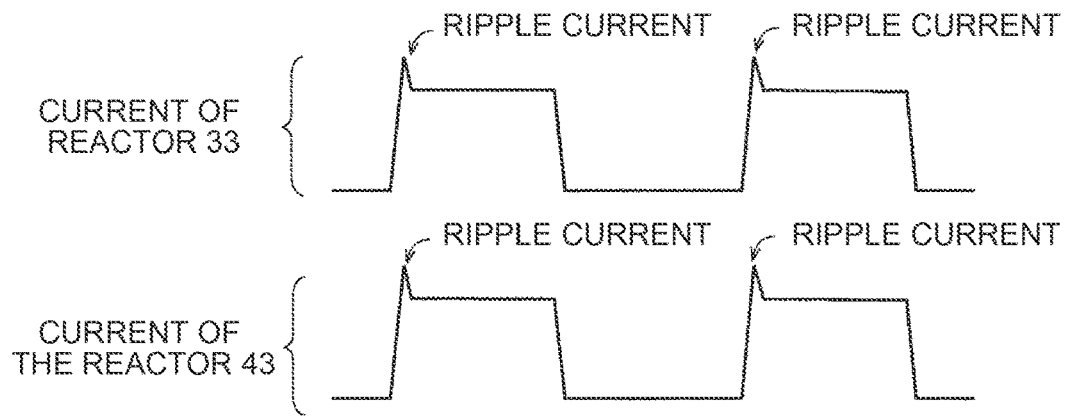
FIG. 3 is a diagram illustrating a current value of a reactor at the time of first control.

As a result, as shown in FIG. 3, the ripple current of the reactor 33 caused by the operation of the first boost converter 30 and the ripple current of the reactor 43 caused by the operation of the second boost converter 40 are generated at the same timing.

The predetermined threshold value is ½ of the maximum allowable value of the current Ib flowing through the secondary battery 10. The threshold of ½ of the maximum allowable value is stored in advance in the memory 202 of ECU 200. The maximum allowable value of the current Ib is a maximum current value determined by the capability of the secondary batteries 10. The secondary battery 10 is designed to be operable within the range of the maximum allowable value or less.

Figure 4:
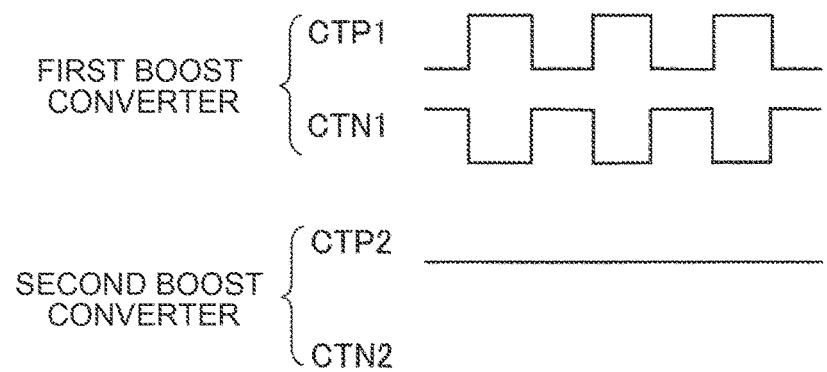
FIG. 4 is a diagram illustrating a second control (one-side control) of the boost converter control device according to an embodiment.
Figure 5:
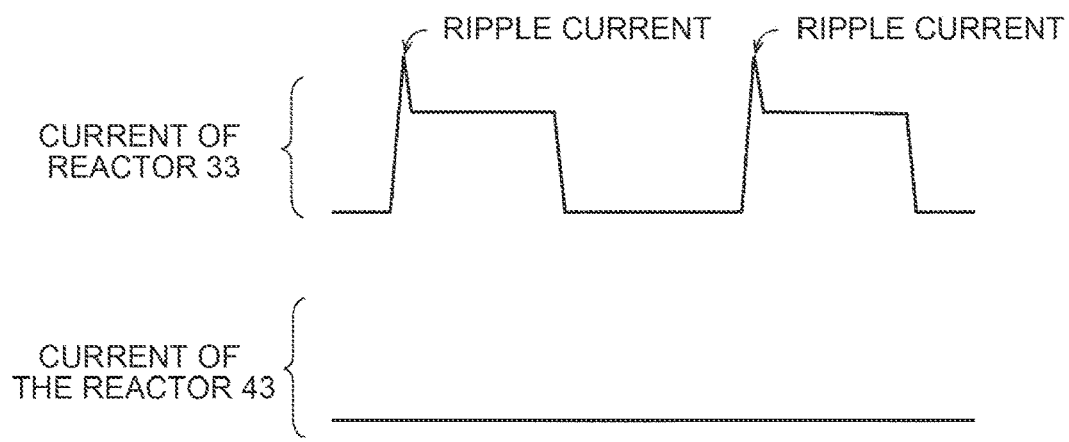
FIG. 5 is a diagram illustrating a current value of a reactor at the time of second control.

Further, in the present embodiment, when warm-up of the secondary battery 10 is required, ECU 200 performs second control (one-side control) for stopping the other of the first boost converter 30 and the second boost converter 40 in response to the current Ib flowing through the secondary battery 10 becoming equal to or lower than the predetermined threshold value, with one of the first boost converter 30 and the second boost converter 40 being operated. For example, as shown in FIG. 4, it is assumed that the second boost converter 40 is stopped in a state in which the first boost converter 30 is operated. In this case, the current value flowing through the reactor 33 of the first boost converter 30 is twice as large as that during the normal operation and the first control. Therefore, as shown in FIG. 5, the ripple current value of the reactor 33 during the second control is larger than the ripple current value of the reactor 33 during the normal operation and the first control.

The ripple current value (Ir) of the reactor is a value based on Equation (1) below. Vin in the following equation (1) means the reactor. Duty means the duty cycle of the boost converter. L means the inductance of the reactor. Fs means the control cycle of the boost converter.

$$Ir = Vin \times Duty / (L \times fs) \quad (1)$$

Figure 6:
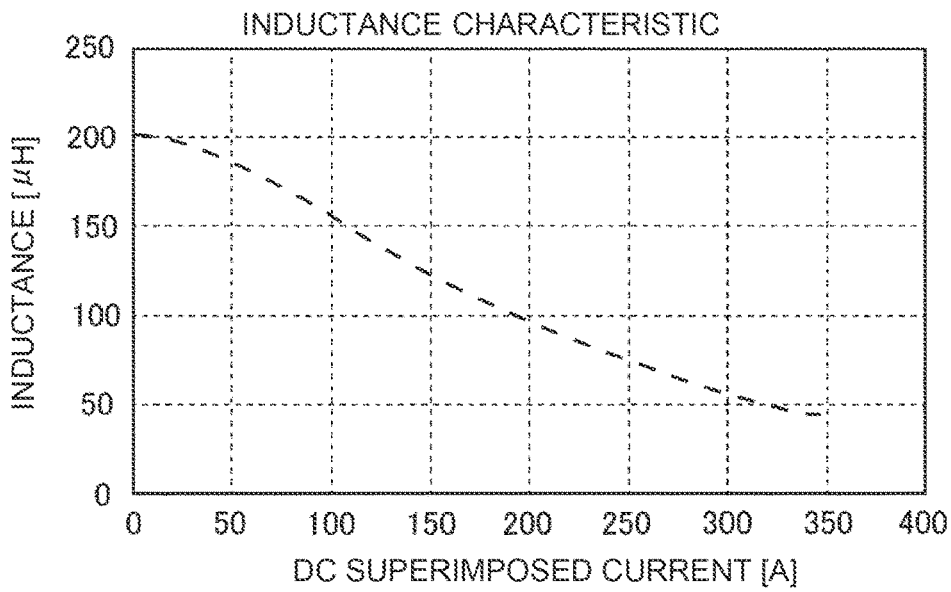
FIG. 6 is a diagram illustrating a relationship between a current value of a reactor and an inductance.

Further, as shown in FIG. 6, in the reactor, the inductance (the vertical axis in FIG. 6) decreases as the current value flowing through the reactor (the horizontal axis in FIG. 6) increases. Therefore, in the second control, the inductance of the reactor is reduced due to an increase in the current flowing through the reactor. As a result, the ripple current of the reactor increases based on the above equation (1).

Figure 7:
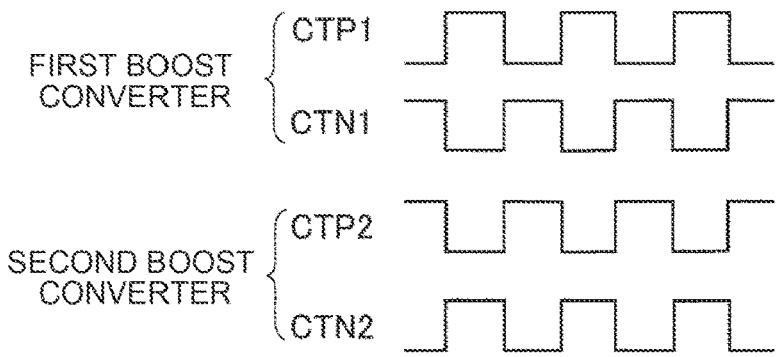
FIG. 7 is a diagram illustrating a third control (normal operation) of the boost converter control device according to the embodiment.

In addition, ECU 200 performs third control (normal operation) to adjust the phases of the first boost converter 30 and the second boost converter 40 to be opposite phases to each other when the warm-up of the secondary batteries 10 is not required. Specifically, as shown in FIG. 7, in the third control, the switching element 41 (CTP 2) is turned off at a timing at which the switching element 31 (CTP 1) is turned on. Further, the switching element 41 (CTP 2) is turned on at a timing at which the switching element 31 (CTP 1) is turned off.

Figure 8:
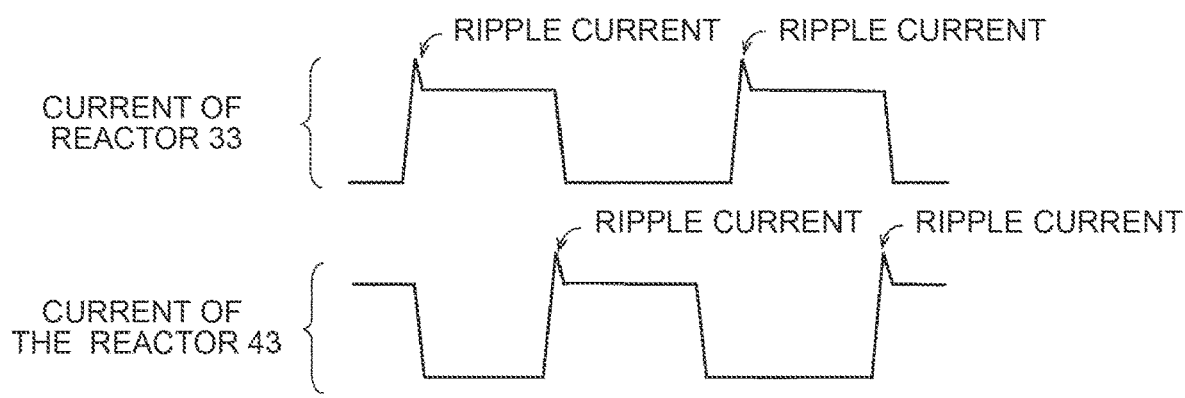
FIG. 8 is a diagram showing the current of the reactor at the time of the third control.

As a result, as shown in FIG. 8, the ripple current of the reactor 33 caused by the operation of the first boost converter 30 and the ripple current of the reactor 43 caused by the operation of the second boost converter 40 are generated at different timings.

Figure 9:
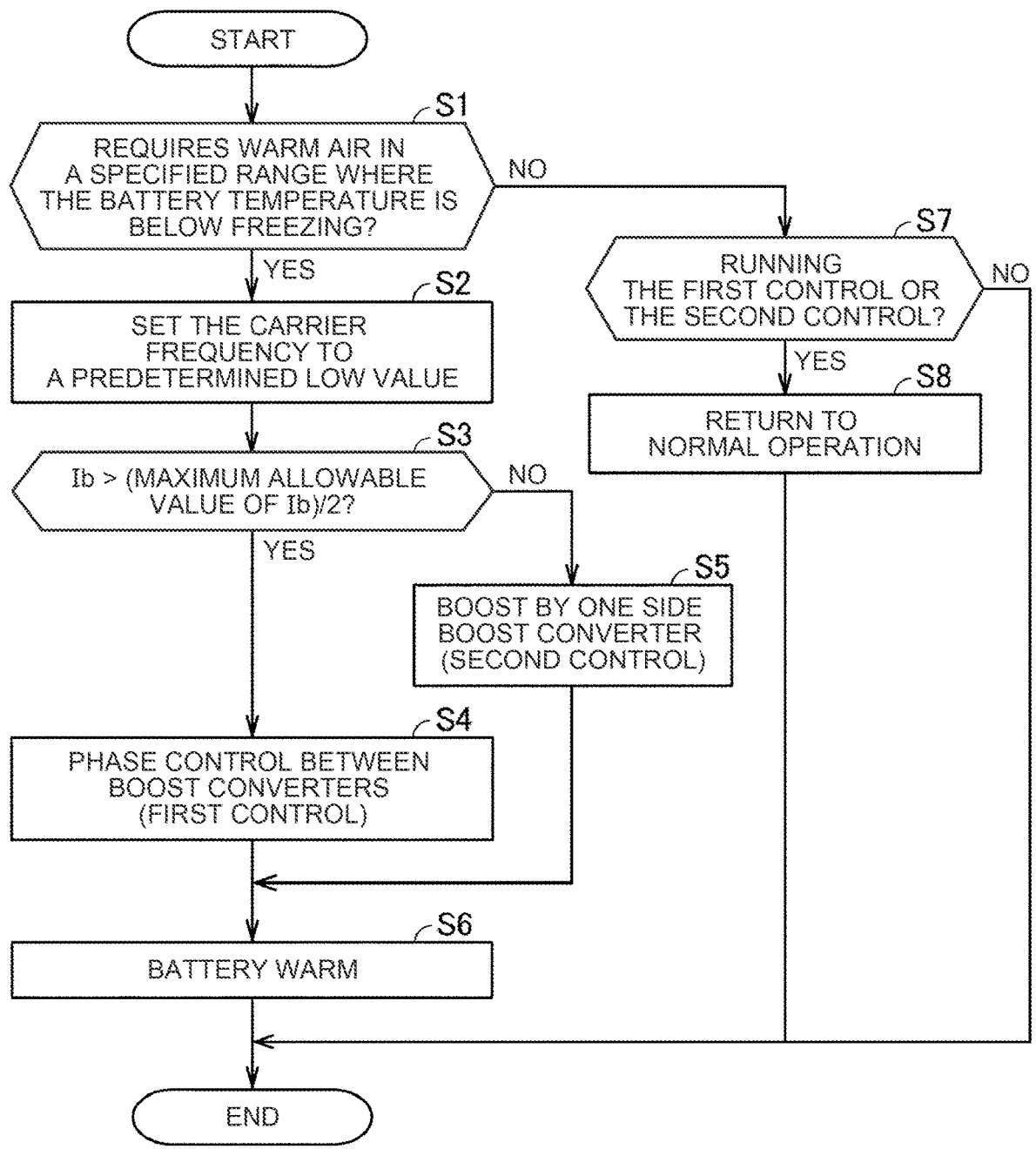
FIG. 9 is a flowchart illustrating a control of a boost converter control device according to an embodiment of the present.

When the detected value of the temperature sensor 60 for measuring the temperature of the secondary battery 10 is within a predetermined range below the freezing point, ECU 200 determines that warm-up is required for the secondary battery 10. The predetermined range is, for example, in the range of –40° C. to 0° C. Control method of boost converter control device Next, a control method of the boost converter control device 1 will be described with reference to FIG. 9. Note that S8 from S1 is executed every predetermined control cycle (for example, 10 minutes).

In S1, ECU 200 determines whether warm-up of the secondary batteries 10 is required. Specifically, when the detected value of the temperature sensor 60 is in a range of a predetermined range (–40° C. to 0° C.) below the freezing point, ECU 200 determines that warm-up of the secondary battery 10 is required. When warm-up of the secondary batteries 10 is required (Yes in S1), the process proceeds to S2. When the warm-up of the secondary batteries 10 is not required (No in S1), the process proceeds to S7.

In S2, ECU 200 sets the carrier frequency (control frequency) for driving the boost converters (30, 40) (for turning the switching elements on and off) to a predetermined low value. The predetermined low value is, for example, the lowest value among the configurable carrier frequencies.

In S3, ECU 200 determines whether or not the value of the current Ib flowing through the secondary battery 10 (the detected value of the current sensor 70) is larger than ½ of the maximal allowable value of the current Ib. If the value of the current Ib is greater than ½ of the maximum-allowed value (Yes in S3), the process proceeds to S4. If the value of the current Ib is less than or equal to ½ of the maximum-permissible value (No in S3), the process proceeds to S5.

In S4, ECU 200 starts a first control (in-phase control) for bringing the phases of the first boost converter 30 and the second boost converter 40 in phase with each other.

In S5, ECU 200 starts a second control (one-side control) for stopping the other of the first boost converter 30 and the second boost converter 40 while one of the first boost converter 30 and the second boost converter 40 is operated. Which of the first boost converter 30 and the second boost converter 40 is stopped may be set in advance.

In S6, ECU 200 warms up the secondary batteries 10 by the first control (in-phase control) or the second control (one-side control).

On the other hand, in S7, ECU 200 determines whether the first control or the second control is being executed. When the first control or the second control is being executed (Yes in S7), the process proceeds to S8. If the first control or the second control is not being executed but is in normal operation (No in S7), the process ends.

In S8, ECU 200 performs a process of returning the operations of the first boost converter 30 and the second boost converter 40 to the third control (normal operation).

As described above, in the above-described embodiment, when warm-up of the secondary battery 10 is required, ECU 200 performs the first control of adjusting the phases of the first boost converter 30 and the second boost converter 40 to be in phase with each other in response to the current value flowing through the secondary battery 10 becoming larger than a predetermined threshold value (½ of the maximum allowable value of the current Ib). In addition, when warm-up of the secondary battery 10 is required, ECU 200 performs second control for stopping the other of the first boost converter 30 and the second boost converter 40 while operating one of the first boost converter 30 and the second boost converter 40 in response to the current flowing through the secondary battery 10 being equal to or lower than the predetermined threshold. Thus, the ripple current generated by the first boost converter 30 and the ripple current generated by the second boost converter 40 can be superimposed on each other by the first control. Further, by the second control, the current Ib flowing through the secondary batteries 10 can be aggregated in either one of the first boost converter 30 and the second boost converter 40. Thus, in each of the first control and the second control, the ripple current generated in the reactor can be increased. As a result, the secondary battery 10 can be warmed up.

Further, in the above-described embodiment, the ripple current is increased by combining the decrease in the carrier frequency of the boost converter and the first control and the second control. As a result, the ripple current can be further increased as compared with a case where only a decrease in the carrier frequency is performed.

In the above-described embodiment, the thresholds of which the first control and the second control are executed are ½ of the maximum allowable value of the current Ib flowing through the secondary battery 10. However, the present disclosure is not limited thereto. The threshold may be a value other than ½ of the maximum allowable value (e.g., ⅓ of the maximum allowable value).

In the above embodiment, an example is shown in which the temperature range of the secondary battery 10 in which it is determined that warm-up of the secondary battery 10 is necessary is below the freezing point. However, the present disclosure is not limited thereto. At least the upper limit of the temperature range may be greater than 0° C.

In the above embodiment, an example is shown in which two boost converters are provided in parallel to each other with respect to the secondary battery 10. However, the present disclosure is not limited thereto. Three or more boost converters parallel to each other with respect to the secondary battery 10 may be provided. In this case, the threshold value of which of the first control and the second control is executed may be a value obtained by dividing the maximum allowable value of the current Ib flowing through the secondary battery 10 by the number of boost converters.

In the above-described embodiment, an example in which control for setting the carrier frequency to a predetermined low value is performed has been described. However, the present disclosure is not limited thereto. The control may not be performed.

In the above embodiment, an example is shown in which one current sensor 70 is provided for two reactors (33, 43). However, the present disclosure is not limited thereto. Two current sensors may be provided to correspond to each of the two reactors.

In the above-described embodiment, an example has been described in which the normal operation is executed when the warm-up of the secondary battery 10 is unnecessary. However, the present disclosure is not limited thereto. When the secondary battery 10 does not require warm-up, the first control (in-phase control) or the second control (one-side control) may be executed.

The embodiment disclosed herein should be considered as illustrative and not restrictive in all respects. The scope of the disclosure is indicated by the appended claims rather than by the foregoing description of the embodiments. The scope of the present disclosure is intended to include all modifications within the meaning and range equivalent to the scope of the claims.

What is claimed is:

1. A boost converter control device for driving a traction motor of an electrified vehicle, the boost converter control device comprising:
    a plurality of boost converters that is connected in parallel to each other to a secondary battery for supplying electric power to the traction motor and boosts a voltage of the secondary battery; and
    a control unit for controlling each of the boost converters, wherein:
    each of the boost converters is composed of a reactor and a switching element; and
    when warm-up of the secondary battery is required, the control unit
        performs first control for adjusting phases of at least two of the boost converters to be in the same phase, in response to a current value flowing through the secondary battery becoming larger than a predetermined threshold value, and
        performs second control for stopping an operation of a part of the boost converters, in response to the current value flowing through the secondary battery becoming equal to or less than the predetermined threshold value.

2. The boost converter control device according to claim 1, wherein the predetermined threshold value is a half of a maximum allowable value of a current flowing through the secondary battery.

3. The boost converter control device according to claim 1, further comprising a temperature sensor for detecting a temperature of the secondary battery, wherein the control unit determines that the warm-up of the secondary battery is required when a detected value of the temperature sensor is within a predetermined range below a freezing point.

4. The boost converter control device according to claim 1, wherein:

the boost converters include a first boost converter and a second boost converter;

the control unit performs third control for adjusting a phase of the first boost converter and a phase of the second boost converter to be in opposite phases from each other, when the warm-up of the secondary battery is not required;

the first control includes control for adjusting the phase of the first boost converter and the phase of the second boost converter to be in the same phase with each other; and the second control includes control of stopping the other of the first boost converter and the second boost converter in a state where one of the first boost converter and the second boost converter is operated.

5. A control method of a boost converter control device for driving a traction motor, wherein:

each of a plurality of boost converters that is connected in parallel to each other to a secondary battery for supplying electric power to the traction motor and boosts a voltage of the secondary battery is composed of a reactor and a switching element; and the control method includes a step of performing first control for adjusting phases of at least two of the boost converters to be in the same phase, in response to a current value flowing through the secondary battery becoming larger than a predetermined threshold value, when warm-up of the secondary battery is required, and a step of performing second control for stopping a part of the boost converters, in response to the current value flowing through the secondary battery becoming equal to or less than the predetermined threshold value, when the warm-up of the secondary battery is required.

* * * * *